UNITED STATES PATENT OFFICE.

RICHARD EILERSEN, OF COPENHAGEN, DENMARK.

PROCESS FOR MAKING CASEIN FROM BUTTERMILK.

1,126,429.  Specification of Letters Patent.  Patented Jan. 26, 1915.

No Drawing.  Application filed March 19, 1914. Serial No. 825,838.

*To all whom it may concern:*

Be it known that I, RICHARD EILERSEN, merchant a citizen of the Kingdom of Denmark, residing at No. 24 Kronprinsessegade, Copenhage, Denmark, have invented certain new and useful Improvements in Processes for Making Casein from Buttermilk, and of which the following is a specification.

Hitherto all casein has been made from skimmed milk only, and it has up to now been considered impracticable to make casein from buttermilk. Now, however, it has been successfully done to make casein from buttermilk by the following process: The buttermilk is heated to 40–65 C., and is left a few hours until the curd has separated from the whey; then the whey is drawn off and the curd is washed with cold water, and cold water is added (while stirring) to such an extent, that the original quantity is again obtained. To this liquid is added enough bicarbonate of soda to dissolve the casein, and this solution is now run through a separator; thus the liquid is divided into three parts; the butterfat of the buttermilk is simply skimmed off through the cream pipe of the separator; the dissolved casein flows out through the other pipe of the separator and the albumen is thrown against the sides of the separator and clings there, and is taken out in thick cakes or layers. The dissolved casein is then precipitated by muriatic acid and washed with cold water; then it is pressed and dried.

I claim as my invention:

1. The process of producing casein from buttermilk consisting in separating the whey and curd by the application of heat, washing the curd with cold water, adding sufficient cold water to replace the separated whey, dissolving the casein by an alkali bicarbonate, separating the casein solution, precipitating the casein by a mineral acid, and washing the precipitate with cold water.

2. The process of making casein from buttermilk consisting in heating the buttermilk to 40–65 C., separating thereby the whey from the curd, drawing off the whey, washing the curd with cold water, adding a quantity of cold water equivalent to the separated whey, dissolving the casein by the addition of a sufficient quantity of bicarbonate of sodium, eliminating the butter fat and separating the albumen, adding muriatic acid to the remaining solution to precipitate the casein, and washing the precipitate with cold water.

In testimony whereof, I affix my signature, in presence of two witnesses.

RICHARD EILERSEN.

Witnesses:
 MARCUS MOELLER,
 VRYGO C. EBERTT.